United States Patent
Ogata et al.

(10) Patent No.: US 7,561,047 B2
(45) Date of Patent: Jul. 14, 2009

(54) NONCONTACT TAG AND METHOD FOR PRODUCING THE SAME

(75) Inventors: Tetsuji Ogata, Tokyo-to (JP); Kiyoshi Imaizumi, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 437 days.

(21) Appl. No.: 11/603,076

(22) Filed: Nov. 22, 2006

(65) Prior Publication Data

US 2008/0117049 A1 May 22, 2008

(51) Int. Cl.
*G08B 13/14* (2006.01)

(52) U.S. Cl. ............... 340/572.1; 340/10.1; 340/572.7; 257/368; 343/702

(58) Field of Classification Search ............... 340/572.1
See application file for complete search history.

(56) References Cited

U.S. PATENT DOCUMENTS 6,368,707 B1* 4/2002 Kamiya et al. ............... 428/349

2003/0166812 A1* 9/2003 Taniguchi et al. ............ 526/274
2003/0179093 A1* 9/2003 Hartmann et al. ........ 340/572.7
2008/0202300 A1* 8/2008 Steidinger et al. ............... 83/39

FOREIGN PATENT DOCUMENTS

| JP | 07-266767 A | 10/1995 |
|---|---|---|
| JP | 08-194801 A | 7/1996 |
| JP | 2003-067708 A | 3/2003 |
| JP | 2006-236081 A | 9/2006 |

* cited by examiner

*Primary Examiner*—Davetta W Goins
*Assistant Examiner*—Samuel J Walk
(74) *Attorney, Agent, or Firm*—Oliff & Berridge, PLC

(57) ABSTRACT

A noncontact IC tag 1 comprises a base film 11, an antenna pattern 2 and an IC chip 3 that are on the base film 11, and a surface-protective member 4 covering the antenna pattern 2 and the IC chip 3. Between the surface-protective member 4 and the base film 11 are present two strip members 10a, 10b that are placed in parallel on both sides of the IC chip 3 so that a bet-shaped space 9 is made between them. The IC chip 3 is positioned in this belt-shaped space 9. For the strip members 10a, 10b, it is preferable to use, paper, a plastic film, or a magnetic sheet with a uniform thickness of 50 to 250 μm.

12 Claims, 6 Drawing Sheets

NONCONTACT TAG AND METHOD FOR PRODUCING THE SAME

BACKGROUND OF THE INVENTION

1. Field of the Invention

The present invention relates to a noncontact tag and to a method for producing the same. More particularly, the present invention relates to a noncontact tag having an IC chip that is protected from external forces by being positioned in a space between two strip members that are placed in parallel on both sides of the IC chip, and to a method for producing the noncontact tag.

Although the noncontact IC tag of the invention can be used as a conventional tag, it is particularly suitable for use under such circumstances that tags are susceptible to external forces, such as in transportation, physical distribution, and production processes of articles, and at construction sites.

2. Background Art

Noncontact IC tags have come to be used widely as identification media in the fields of transportation, physical distribution, etc., or for such purposes as quality control, stock control, etc. because information can be recorded and stored in them and the stored information is exchangeable by communication with external devices without bringing them into contact with the devices.

However, when noncontact IC tags are used as labels in the field of physical distribution, they are often unavoidably stressed externally. If the IC chip portions of the noncontact IC tags undergo impacts, their damage is fatal. Various structures effective for protection of IC chip portions have been proposed so far. However, they are so complicated that they make it difficult to produce noncontact IC tags inexpensively.

There have been demands for noncontact IC tags having flat (plane) surfaces. It is however not easy to produce such noncontact IC tags.

An unavoidable structural problem with noncontact IC tags is that IC chips are much greater than base films, etc. in thickness. Although IC chips have been made smaller in size and thickness, the presently used IC chips are still 0.2 to 2 millimeters square in plane size and 100 to 500 μm in thickness. Therefore, even if an IC tag label is produced by connecting an IC chip to an antenna pattern formed on a base film and covering them with a surface-protective member to flatten the label surface, when a large number of the IC tag labels obtained in this manner are piled up, the total thickness of the IC chip portions becomes greater than that of the other portions of the IC tag labels.

IC chips are damaged when IC tags are piled up. Several to more than ten noncontact IC tag labels are often piled up before use, and it is common practice, for easy handling, to put one label over another in the same direction. If the labels are so piled up, the IC chip portions of the labels are inevitably brought into such a state that one IC chip portion lies on top of another. If a heavy object is put on top of the pile of the labels, the IC chips impact against one another, and silicon crystals constituting the IC chips are broken. The noncontact IC tag labels with the IC chips damaged in this manner are regarded as defective even if they are unused. Another cause of the failure of IC chips is collision of IC tags attached to rigid objects with other rigid objects. Also in this case, the IC chip portions projecting from the tag surfaces are susceptible to impact.

Although the causes of the failure of IC chips are not limited to the above-described ones, it is considered to be true that thick IC chips tend to be damaged when they are brought into contact with or collide with rigid materials such as metals.

An embodiment of a conventional noncontact IC tag is shown in FIG. 6 for reference.

A noncontact IC tag 1 comprises a base film 11, an antenna pattern 2 formed on the base film 11, and an IC chip 3 connected to both ends 2a, 2b of the antenna pattern 2 in the form of a coil. The noncontact IC tag 1 shown in FIG. 6 is one which the antenna pattern 2 in the form of a coil is formed by photo-etching metal foil that has been laminated to a transparent base film 11. FIG. 6 shows the noncontact IC tag 1 as viewed from the side that will be directed to an adherend. One end of the antenna pattern 2 is connected, with a caulker or the like, to a conducting circuit 17 penetrating into the back surface of the base film, thereby connecting both ends 2a, 2b of the antenna coil of the antenna pattern 2. The IC chip 3 is connected to both ends 2a, 2b by fixing its pad to the ends with an electrically conductive adhesive or the like. Although not shown in the figure, a pattern for thickness adjustment may also be formed around the IC chip 3. However, the thickness of the metal foil for the antenna is about 20 to 35 μm, and the total thickness of the metal foil and the pattern for thickness adjustment cannot become equal to the thickness of the IC chip 3.

The following Patent Documents 1 and 2 concern noncontact IC cards (smart cards) that belong to the technical field to which noncontact IC tags belong. The subject matters of these patents are to make IC cards uniform in thickness to make their surfaces flat. An attempt has been made to flatten not only IC cards but also noncontact IC tags, but it is confronted with a problem that the range of material choice is limited because low prices are desirable for noncontact IC tags. Further, even if IC tags are made as flat as possible, it is impossible to completely prevent IC chips from being damaged. Patent Document 3 relates to a method for producing an IC tag label, and the subject matter of the patent is to obtain a flat (plane) IC tag label. The subject matter of Patent 4 is the same as that of the present application. Patent 4 is different from the present application in that a protective member with a cavity is placed only around an IC chip.

Patent Document 1: Japanese Laid-Open Patent Publication No. 266767/1995,

Patent Document 2: Japanese Laid-Open Patent Publication No. 194801/1996,

Patent Document 3: Japanese Laid-Open Patent Publication No. 67708/2003, and

Patent Document 4: Japanese Patent Application No. 051036/2005.

The method of making thickness uniform, conventionally adopted in IC cards, is disadvantageous from the viewpoint of reduction in production cost and of material choice. Further, some difficulties have been found in the actual production process of the noncontact IC tag proposed in the above Patent Document 4.

SUMMARY OF THE INVENTION

An object of the present invention is to provide a noncontact tag whose IC chip portion is protected without making, as in conventional IC cards (smart cards), the thickness of the tag uniform, and a method for producing the noncontact tag.

The present invention is a noncontact tag comprising a base film, a noncontact circuit formed on the base film, a surface-protective member covering the noncontact circuit, and two strip members placed between the base film and the surface-protective member, on both sides of the noncontact circuit, a belt-shaped space being made between the two strip members so that the noncontact circuit is positioned in the space.

The present invention is the noncontact tag in which the strip members are made of paper or a plastic film with a uniform thickness of 50 to 250 µm.

The present invention is the noncontact tag in which the strip members are made of a magnetic sheet with a uniform thickness of 50 to 250 µm.

The present invention is the noncontact tag in which the noncontact circuit is an IC circuit composed of an antenna pattern and an IC chip connected to the antenna pattern, the IC chip being positioned in the belt-shaped space between the two strip members.

The present invention is the noncontact tag in which the noncontact circuit is a resonance circuit composed of a helical pattern and a condenser pattern, the resonance circuit being positioned in the belt-shaped space between the two strip members.

The present invention is the noncontact tag in which the noncontact circuit is a magnetic circuit having a magnet-sensitive wire, the magnetic circuit being positioned in the belt-shaped space between the two strip members.

The present invention is the noncontact tag in which the base film or the surface-protective member is made from a flame-retardant material containing a halogen-free flame retardant.

The present invention is the noncontact tag in which an adhesive layer is formed on the back surface of the base film, a material having at least one of antibacterial action and mildewproofing action being used to form the adhesive layer.

The present invention is the noncontact tag in which the strip members are laminated to the base film with an adhesive layer, and the surface-protective member is laminated to the strip members with an adhesive layer, materials having at least one of antibacterial action and mildewproofing action being used to form the two adhesive layers.

The present invention is a method for producing a noncontact tag, comprising the steps of (1) forming a plurality of noncontact circuits on a continuous base film, (2) placing in parallel a large number of strip members on the base film so that one noncontact circuit is positioned in a belt-shaped space between each two neighboring strip members, (3) laminating a continuous surface-protective member to the noncontact circuits and the strip members, and (4) cutting the laminate of the continuous base film and the continuous surface-protective member into sections so that each section contains one noncontact circuit, or perforating this laminate so that the laminate can be cut along the perforations into sections, each section containing one noncontact circuit.

The present invention is the method for producing a noncontact tag, in which the strip members are made of paper or a plastic film with a uniform thickness of 50 to 250 µm.

The present invention is the method for producing a noncontact tag, in which the strip members are made of a magnetic sheet with a uniform thickness of 50 to 250 µm.

According to the present invention, since the noncontact IC tag has strip members that are placed in parallel on both sides of the IC chip, the IC chip is positioned in the belt-shaped space between the two strip members and is thus not susceptible to external forces. Therefore, even when this IC tag is handled in a conventional manner, the IC chip in the IC tag is not easily damaged unlike IC chips in conventional IC tags.

The production method according to the invention is that the step of placing the strip members on both sides of the IC chip is merely added to the conventional production process of a noncontact IC tag. The method of the present invention therefore makes it possible to produce relatively easily a noncontact IC tag having a structure effective for IC chip protection.

DETAILED DESCRIPTION OF THE INVENTION

First Embodiment

Figure 1:
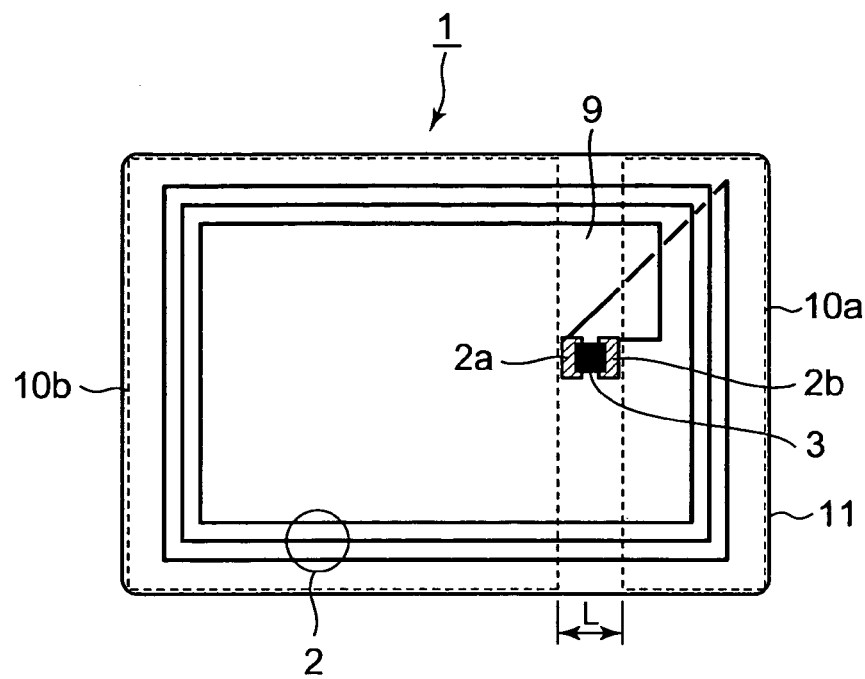
FIG. 1 is a diagrammatic plan view of a noncontact IC tag according to a first embodiment of the present invention.
Figure 3:
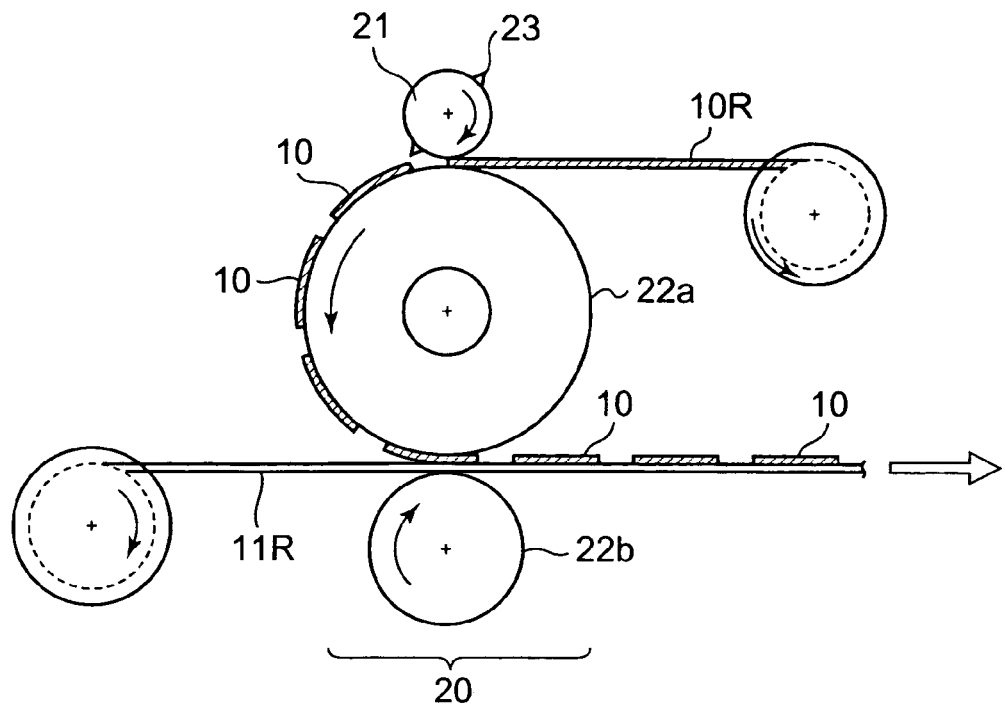
FIG. 3 is a view illustrating a method for producing a noncontact IC tag.
Figure 4:
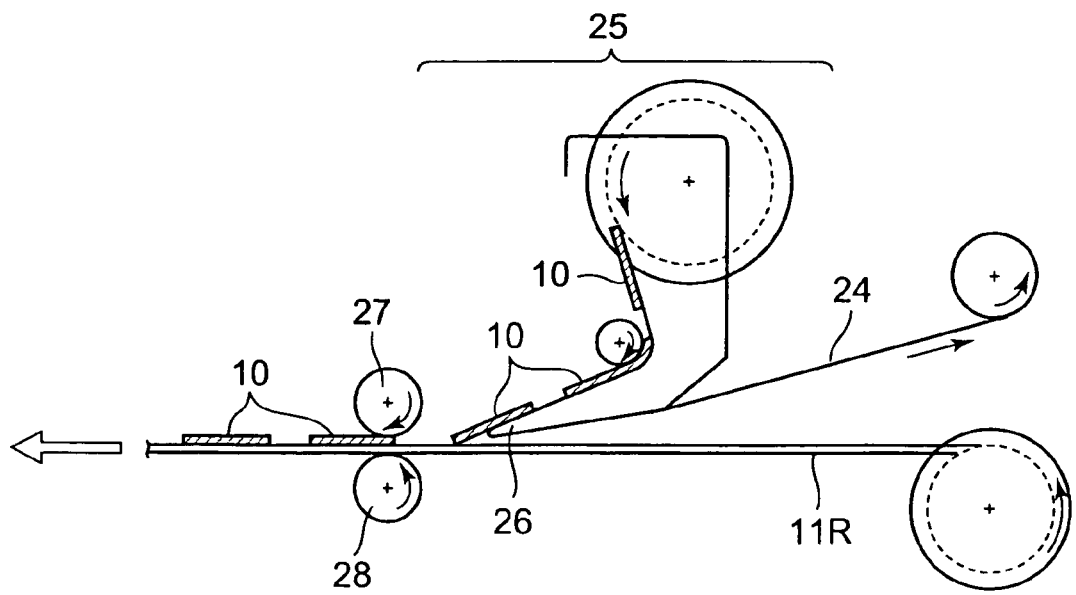
FIG. 4 is a view illustrating another method for producing a noncontact IC tag.

The present invention relates to a noncontact IC tag having a structure effective for IC chip protection (hereinafter simply referred to as a "noncontact IC tag") and to a method for producing the noncontact IC tag. With reference to the accompanying drawings, the present invention will be described hereinafter. FIG. 1 is a diagrammatic plan view of a noncontact IC tag of the present invention, and FIG. 2, a sectional view of the noncontact IC tag. FIG. 3 is a view illustrating a method for producing a noncontact IC tag, and FIG. 4 is a view illustrating another method for producing a noncontact IC tag. FIGS. 5(A) and 5(B) are views illustrating a processing method for producing a noncontact IC tag.

As shown in FIG. 1, a noncontact IC tag 1 of the present invention comprises a base film 11, an antenna pattern 2 formed on the base film 11, and an IC chip 3 connected to both ends 2a, 2b of the antenna pattern 2.

On both sides of the IC chip 3, two strip members 10a, 10b with a uniform thickness are placed apart in parallel so that a belt-shaped space 9 is made between them. The strip members 10a, 10b have a thickness equal to that of the IC chip 3 or great enough to make the projection of the IC chip 3 from the tag surface small. Therefore, the two strip members 10a, 10b can serve as protective barriers for the IC chip 3 and buffer the impact of external forces upon the IC chip 3 when the IC chip 3 is brought into contact with the IC chip 3 of another noncontact IC tag or collides with a rigid object.

The antenna pattern 2 and the IC chip 3 constitute an IC circuit, as a noncontact circuit.

The space 9 should have a width L large enough to contain therein the IC chip 3. Although this width L depends on the plane size of the IC chip 3, a width L of approximately 1.0 to 5.0 mm is sufficient for an IC chip 3 in the size of less than 1.0 millimeter square. This is because if the space 9 has an excessively large width L, the strip members cannot serve as protective barriers against pointed objects and cannot bring about impact-buffering effect.

Figure 2:
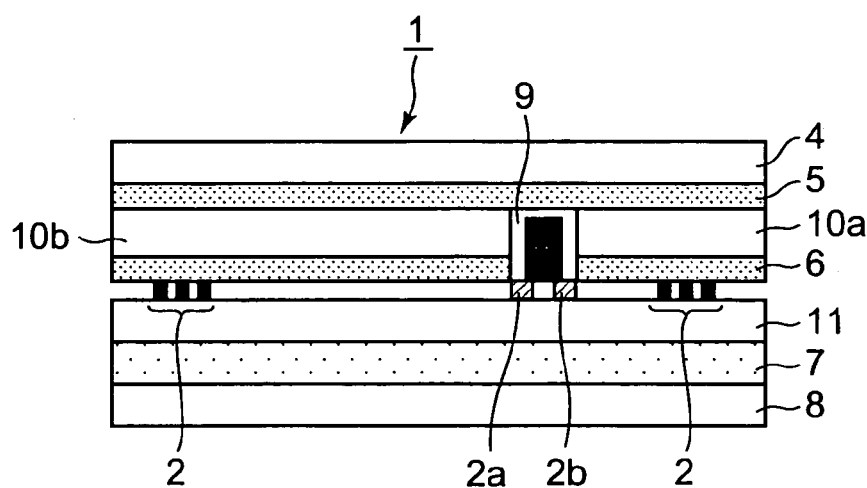
FIG. 2 is a sectional view of the noncontact IC tag shown in FIG. 1.

The sectional structure of the noncontact IC tag 1 of the present invention is shown in FIG. 2. As shown in this figure, the strip members 10a, 10b are laminated to the base film 11, on which the antenna pattern 2 has been formed, and are then covered with a surface-protective member 4. The surface-protective member 4 is laminated to the strip members 10a, 10b with an adhesive layer 5 to cover usually the whole noncontact tag 1 for protection.

A pressure-sensitive adhesive layer 7 is formed on the base film 11 surface that will be faced to an adherend. The pressure-sensitive adhesive layer 7 is formed beforehand on release paper 8 having a surface coated with a release agent, and this release paper 8 is laminated to the base film 11 of the noncontact IC tag 1 with the pressure-sensitive adhesive layer 7 facing to the base film 11.

The noncontact IC tag 1 may be not only in the form of a label but also in the form of a card which a indication sheet, substitutive of the surface-protective member 4, is originally laminated to the base film 11. Since a noncontact IC tag 1 in the latter form is not attached to any object, it has no pressure-sensitive adhesive layer 7. Such a tag is also called a laminated card. Noncontact IC tags of the present invention can be used as both labels and laminated cards.

The strip members 10a, 10b are made of paper or a plastic film, for example.

An adhesive 6 is applied to the surfaces of the strip members 10a, 10b on the side of the antenna pattern 2, and with the adhesive layer 6, the strip members 10a, 10b are laminated to the base film 11 bearing the antenna pattern 2. The strip members 10a, 10b are perfect as barriers for protecting the IC chip 3 from damage when the strip members 10a, 10b have a thickness equal to that of the IC chip 3. However, even if the thickness of the strip members 10a, 10b is about 1/10 to 1/2 of that of the IC chip 3, the strip members 10a, 10b can satisfactorily serve as protective barriers. This is because even if the strip members 10a, 10b have a thickness not equal to that of the IC chip 3, the surface-protective layer 4 and the base film 11 act to prevent direct collision of the IC chips of two IC tags.

Therefore, in the case where the IC chip 3 has a thickness of 500 μm, the strip members 10a, 10b can fully serve as barriers for protecting the IC chip 3 as long as their thickness is from 50 to 250 μm, preferably about 100 to 250 μm. The IC chip-protecting effect cannot be satisfactorily obtained when the strip members 10a, 10b have a thickness of less than 50 μm, unless the IC chip 3 is made thinner than ever.

Not only paper or a plastic film but also a magnetic sheet may be used for the strip members 10a, 10b. The magnetic sheet herein means a magnetic material in the form of a sheet, having high magnetic permeability.

A ferritic material is usually used for the magnetic sheet. Examples of ferritic materials useful herein include (a) ferrite alone, (b) composites of ferrite/plastics, and (c) composites of ferrite/metallic compounds/plastics.

Ferrite powder or flakes is used as the ferrite. For the above-described plastics may be used thermoplastics which are good in processability, or thermosetting plastics which are good in heat resistance. Examples of metallic powders useful herein include carbonyl iron dust, atomized powders of iron-permalloy powder, etc., and reduced iron powder. The metallic powder may be shaped with a plastic, or sintered or compacted together with ferrite powder. Amorphous magnetic sheets are also known as new magnetic materials. A magnetic sheet having the same thickness as that of the above-described paper or plastic film can be used.

When a noncontact IC tag is attached to an electrically conductive member such as a metal-made object or a metal container, eddy current flows in the metal of the object owing to the AC magnetic field produced by electromagnetic waves that the IC tag uses for data transmission/reception. This eddy current produces magnetic flux that repels the magnetic flux for data transmission/reception. The magnetic flux for data transmission/reception is thus reduced, which often makes data transmission/reception difficult.

In the case where a magnetic sheet is used for the strip members 10a, 10b, the magnetic flux for data transmission/reception penetrates through the magnetic sheet and enters the metal to suppress the occurrence of eddy current. A magnetic sheet is used in expectation of this effect.

Next, a method for producing a noncontact IC tag according to the present invention will be described.

The noncontact IC tag 1 can be produced by a method, a modification of the conventional method for producing a noncontact IC tag. Namely, after connecting the IC chip 3 to the antenna pattern 2 formed on the base film 11, and before laminating the surface-protective member 4 to the base film 11 bearing the IC chip 3 and the antenna pattern 2, the strip members 10a, 10b are laminated to the base film 11 after conducting positioning. Even the existing automated line can be used for this process. Only the step of laminating the strip members 10a, 10b to the base film 11, which is characteristic of the present invention, will now be described because the other steps in the production process of the noncontact IC tag, such as the step of forming the antenna pattern 2 on the base film 11, have already been known.

FIG. 3 is a view illustrating a method for producing a noncontact IC tag according to the present invention.

To a dispensing unit 20 in an IC tag processing system, paper 10R for the strip members, coated with a pressure-sensitive adhesive, is fed from the top right-hand side of the dispensing unit 20, while a continuous member 11R that is a base film 11 on which a large number of IC circuits, each circuit having an antenna pattern 2 and an IC chip 3, have been formed in a row is fed from the bottom left-hand side of the dispensing unit 20 at a constant rate. The paper 10R for the strip members, coated with a pressure-sensitive adhesive, is cut into strip members 10 with a predetermined length by the blade 23 of a rotary cutter 21 rotating in synchronization with the dispensing unit 20. The length of the cut paper, or the strip member 10, is smaller than the noncontact IC tag pitch by a value equal to the width L of the above-described space 9. In this case, the surface of strip member 10 that will not be brought into contact with a drum 22a in the dispensing unit 20 is covered with an adhesive layer 6 (see FIG. 2).

The drum 22a in the dispensing unit 20 immediately sucks the cut strip member 10 by means of a vacuum suction mechanism and rotates to carry it.

The drum 22a in the dispensing unit 20 carries the strip member 10 to the point at which the strip member 10 meets the continuous member 11R, the base film. At this point, the strip member 10 is laminated to the continuous member 11R, or the base film, by pressure exerted by the drums 22a, 22b.

In the above process, the rotary speed (circumferential speed) of the drums 22a, 22b in the dispensing unit 20 and the running speed of the continuous member 11R, the base film, are set so that the latter is faster than the former by a value corresponding to the width L of the above-described space 9. In other words, it is possible to change the width L of the space 9 by controlling the running speed of the continuous member 11R. After laminating the strip members 10 to the base film 11, the step of laminating the surface-protective member 4 to the strip members 10 is preformed.

Figure 5:
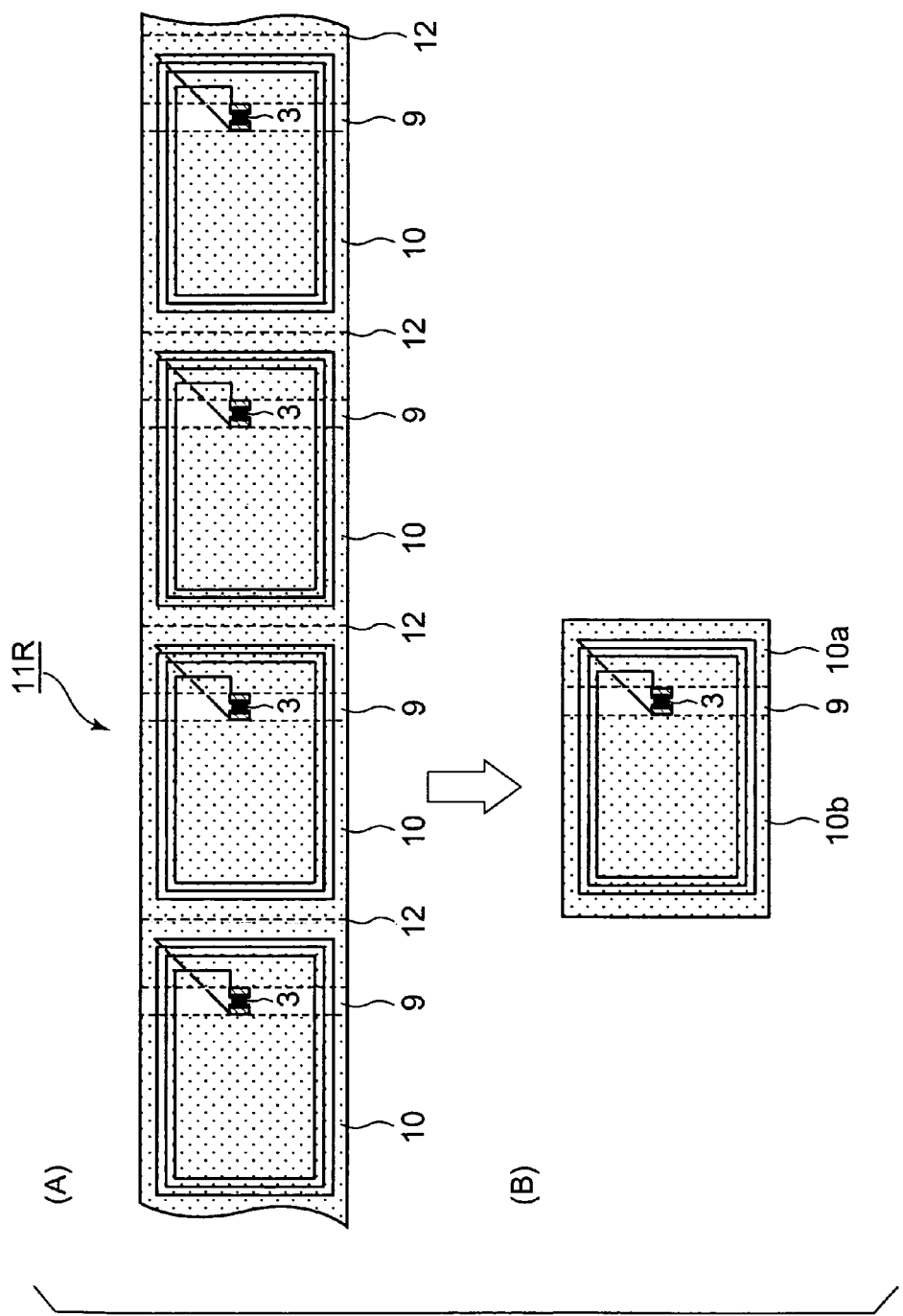
FIGS. 5(A) and 5(B) are views illustrating a processing method for producing a noncontact IC tag.

FIG. 5 is a view illustrating a processing method for producing a noncontact IC tag.

The above-described production method is based on the assumption that the strip members 10 are laminated to the continuous member 11R, the base film, as shown in FIG. 5(A). By cutting the continuous member 11R, the base film, into individual noncontact IC tags 1 (FIG. 5(B)), each noncontact IC tag is to have two strip members 10a and 10b.

After laminating the surface-protective member 4 to the surfaces of the strip members 10, the laminate is cut into individual noncontact IC tags, each tag having one IC circuit, or is provided with lines 12, such as perforations, along which the laminate can be cut to give individual noncontact IC tags 1, each tag having one IC circuit. In the former case, the continuous laminate is cut into individual tags along lines that correspond to the lines 12 in the latter case.

FIG. 4 is a view illustrating another method for producing a noncontact IC tag according to the present invention.

The method shown in FIG. 4 is that a labeling machine 25 is used for laminating the strip members 10 to the continuous base film 11R. In this method, stamped labels (strip members 10) in a predetermined size, held by a release film 24, are fed to the labeling machine 25 and are laminated to a continuous base film 11R. The release-film 24-side surfaces of the labels (strip members 10) have been coated with a pressure-sensitive adhesive. The step of laminating the labels (strip members 10) to the base film by the labeling machine 25 is performed in the following manner: the labels (strip members 10) separated from the release film 24 one after another with a separation blade 26 of the labeling machine 25 are pressed against the continuous base film 11R by rollers 27, 28, thereby laminating the labels to the continuous base film 11R. In this process, the labeling machine 25 is set so that the labels are laminated to the continuous base film 11R at the points previously marked on the base film 11R. In this method, it is necessary to prepare beforehand a label transfer material on which the labels (strip members 10) are formed at predetermined intervals. The release film 24 from which the labels have been removed by the separation blade 26 is wound up while the labels are laminated to the base film.

Another possible method is that continuous paper for the strip members is laminated to a continuous base film 11R on which IC tag circuits have been formed at predetermined intervals on the longer side of the base film, while cutting the continuous paper into strip members 10a, 10b with different widths, the strip members being laminated to the base film 11R so that they are positioned on both sides of each IC chip 3. For the above process, it is not necessary to use the dispensing unit 20, but is needed only a planar, sequentially processing system. This process is therefore favorable for mass production.

After the strip members 10a, 10b have been laminated to the base film 11R, the surface-protective member 4 is laminated to them. The laminate obtained is then cut into individual noncontact IC tags so that each tag has one IC circuit, or is provided with lines 12, such as perforations, along which the laminate can be cut to give individual noncontact IC tags, each tag having one IC circuit.

<Other Materials>
(1) Base Film

A variety of plastic films can be used for the base film. One of the following films, or a composite film of two or more of the following films, may be used as the base film: films of polyethylene terephthalate (PET), PET-G (terephthalic acid-cyclohexane dimethanol-ethylene glycol copolymers), polyvinyl chloride, vinyl chloride-vinyl acetate copolymers, polycarbonate, polyamide, polyimide, cellulose diacetate, cellulose triacetate, polystyrenes, ABS, polyacrylic esters, polypropylene, polyethylene, polyurethane, and so forth.

(2) Strip Member

Woodfree paper, coated paper, craft paper, glassine paper, synthetic paper, and latex- or melamine resin-impregnated paper can be used for the strip member. Plastic films may also be used for the strip member, and it is possible to use the above-described plastic films and composite plastic films useful for the base film. As mentioned above, a magnetic sheet may also be used for the strip member.

(3) Surface-Protective Member

A variety of plastic films and paper, including the above-enumerated paper useful for the strip member, and the above-described plastic films and composite plastic films useful for the base film, are suitable for the surface-protective member.

(4) Adhesive, Pressure-Sensitive Adhesive

The word "adhesive" herein used encompasses adhesives of various types, such as solvent type adhesives, polymerization type adhesives, ultraviolet-curing adhesives, emulsion adhesives, and hot-melt adhesives, and so-called pressure-sensitive adhesives are also included in this word. This is because adhesives of any type can meet the purpose of laminating two members.

The word "pressure-sensitive adhesive" as used herein means an adhesive whose viscosity does not significantly increase with time and whose mild tackiness remains almost permanently.

Examples of resin materials herein useful for the adhesive and the pressure-sensitive adhesive include natural rubber, nitrile rubber, epoxy resins, vinyl acetate emulsions, polyesters, acrylic resins, acrylic ester copolymers, polyvinyl alcohols, and phenolic resins.

EXAMPLES

The first embodiment of the present invention will now be described more specifically by way of Examples.

Example 1

A laminate (a continuous film with a width of 54 mm) of a transparent, biaxially oriented polyester film with a thickness of 38 μm and aluminum foil with a thickness of 25 μm, obtained by dry lamination, was used as the base film 11 of a noncontact IC tag. A photosensitive resist was applied to this continuous film. The resist surface was covered with a photomask having antenna patterns 2 and was then exposed to light.

Figure 6:
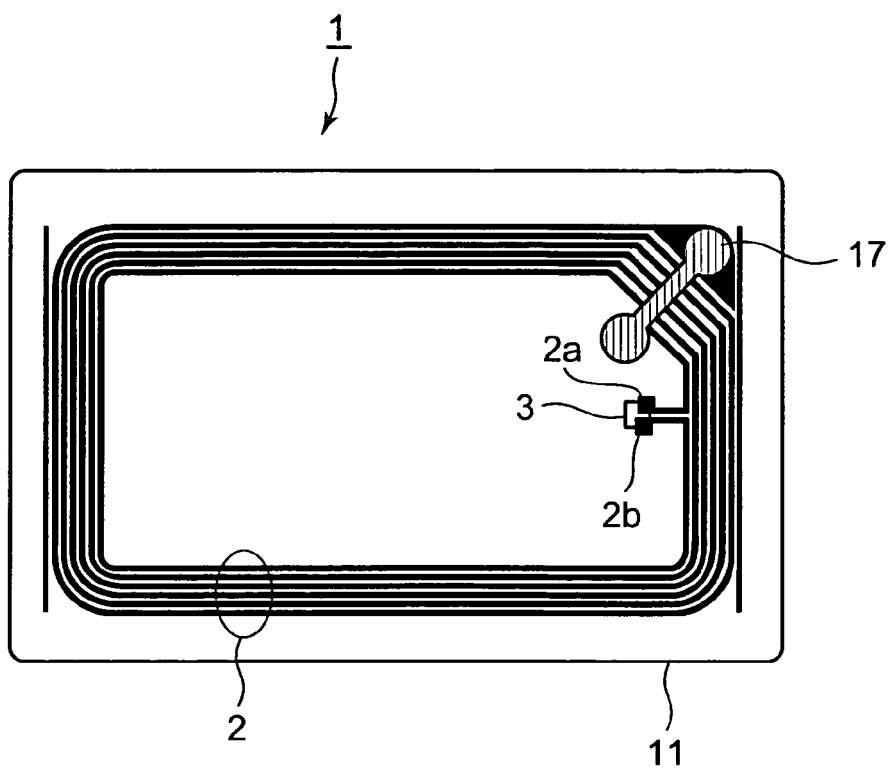
FIG. 6 is a view showing an embodiment of a conventional noncontact IC tag.

After conducting exposure development, the resist layer was photo-etched, thereby obtaining an inlet base film having the antenna patterns 2. The external size of each antenna pattern 2 was made about 45 mm×76 mm (see FIG. 6).

To both ends 2a, 2b of each antenna pattern 2 on the above-described inlet base film 11, an IC chip 3 with a plane size of 1.0 millimeter square and a thickness of 310 μm, having spiky bumps, was connected by hot pressing with the IC chip 3 facing down.

A PET film with a thickness of 150 μm and a width of 54 mm, coated with a polyester hot-melt adhesive, was used for the strip member 10. While cutting this film into strips with a length of 82 mm by means of a dispensing unit 20 in an IC tag processing machine, the strip members 10 were laminated to the continuous base film 11R on which the noncontact IC tag circuits have been formed (see FIG. 3). In this step, the strip members 10 were placed in parallel on both sides of each IC chip 3 on the base film 11R to make, between them, a space 9 with a width L of 4 mm (see FIG. 1).

A surface-protective member (coated paper) 4 with a thickness of 40 μm was laminated, with a polyester hot-melt adhesive sheet, to the above strip members 10 by hot pressing. Release paper 8 was then laminated to the back surface of the base film 11 with a 32-μm thick pressure-sensitive adhesive layer 7, thereby obtaining a continuous laminate having a plurality of noncontact IC tags 1. Finally, the continuous laminate was provided, as shown in FIG. 5, with perforations 12 along which the laminate would be able to be cut to give individual noncontact IC tag labels 1 having a width of 54 mm and a length of 86 mm.

Example 2

An inlet base film having antenna patterns 2 was prepared using the same process and materials as those used in Example 1. The external size of each antenna pattern 2 was made about 45 mm×76 mm.

A 50-μm thick magnetic sheet ("IRL02" (trade name) manufactured by TDK Corporation, Japan) useful for the strip member 10 was processed into a label transfer material bearing magnetic, pressure-sensitive adhesive labels. The width and length of each magnetic label were made 54 mm and 82 mm, respectively.

The label transfer material prepared using the magnetic sheet, and the continuous base film 11R bearing the noncontact IC tags were set in a labeling machine 25 as shown in FIG. 4. After conducting positioning, the labels 10 were laminated to the base film 11R so that they were positioned in parallel on both sides of each IC chip 3 to make between them a space 9 with a width L of 4 mm (see FIG. 1).

A 40-μm thick surface-protective member (coated paper) 4 was laminated to the above strip members 10 with a vinyl acetate emulsion adhesive. Release paper 8 was then laminated to the back surface of the base film 11 with a pressure-sensitive adhesive layer 7 having a thickness of 32 μm. Finally, the continuous laminate thus obtained was, as shown in FIG. 5(B), cut along the perforations 12 into individual noncontact IC tags 1 having a width of 54 mm and a length of 86 mm.

The noncontact IC tag 1 of Example 1, that of Example 2, and a conventional noncontact IC tag were subjected to various actual service tests. The tests show that the noncontact IC tags 1 of Examples 1 and 2 scarcely suffer IC chip damage as compared with the conventional noncontact IC tag.

Further, the noncontact IC tag of Example 2 caused no communication trouble even when it had been attached to a metal-made object such as a metal container.

In this embodiment, the IC circuit having the antenna pattern 2 and the IC chip 3 is formed on the base film 11 as a noncontact circuit, and the IC chip 3 is placed between the two strip members 10. Instead of the IC circuit, a resonance circuit having a helical pattern and a condenser pattern, which will be described later, may be formed as a noncontact circuit on the base film 11 and placed between the two strip members 10.

Alternatively, a magnetic circuit having a magnet-sensitive wire may be formed on the base film 11 as a noncontact circuit and placed between the two strip members 10.

Second Embodiment

The present invention relates to a flame-retardant tag in the form of a noncontact IC tag, a resonance tag, or a magnetic tag. The flame-retardant tag of each type will be described hereinafter with reference to the accompanying drawings.

Figure 7:
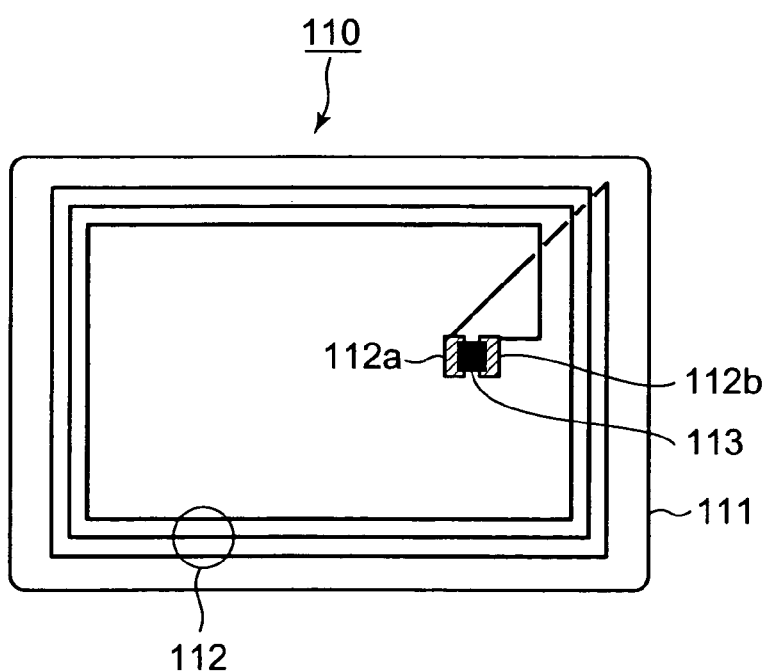
FIG. 7 is a plan view of a flame-retardant tag, in the form of a noncontact IC tag, according to a second embodiment of the present invention.
Figure 8:
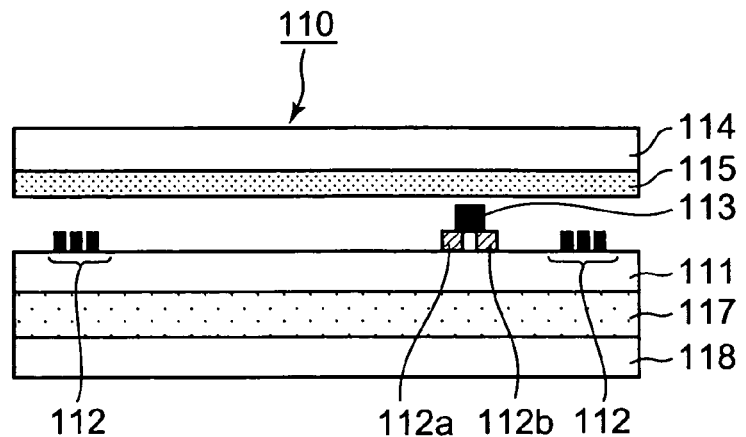
FIG. 8 is a sectional view of the flame-retardant tag shown in FIG. 7.
Figure 9:
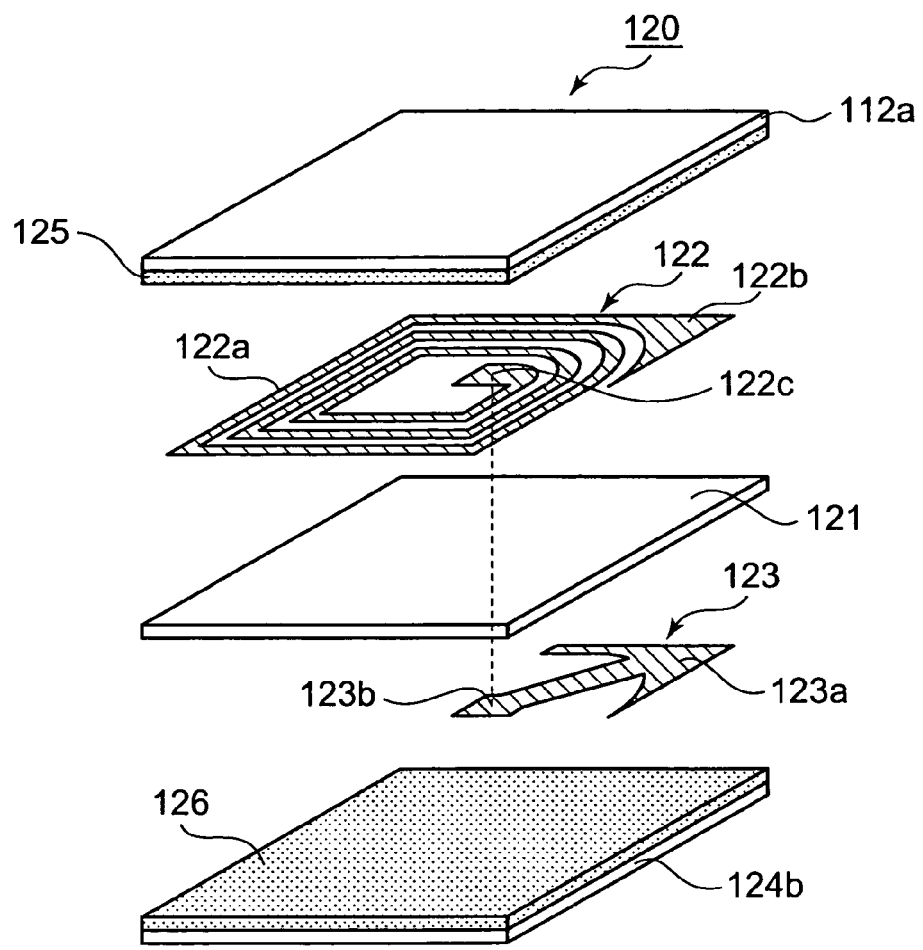
FIG. 9 is an exploded perspective view of a flame-retardant tag in the form of a resonance tag.
Figure 10:
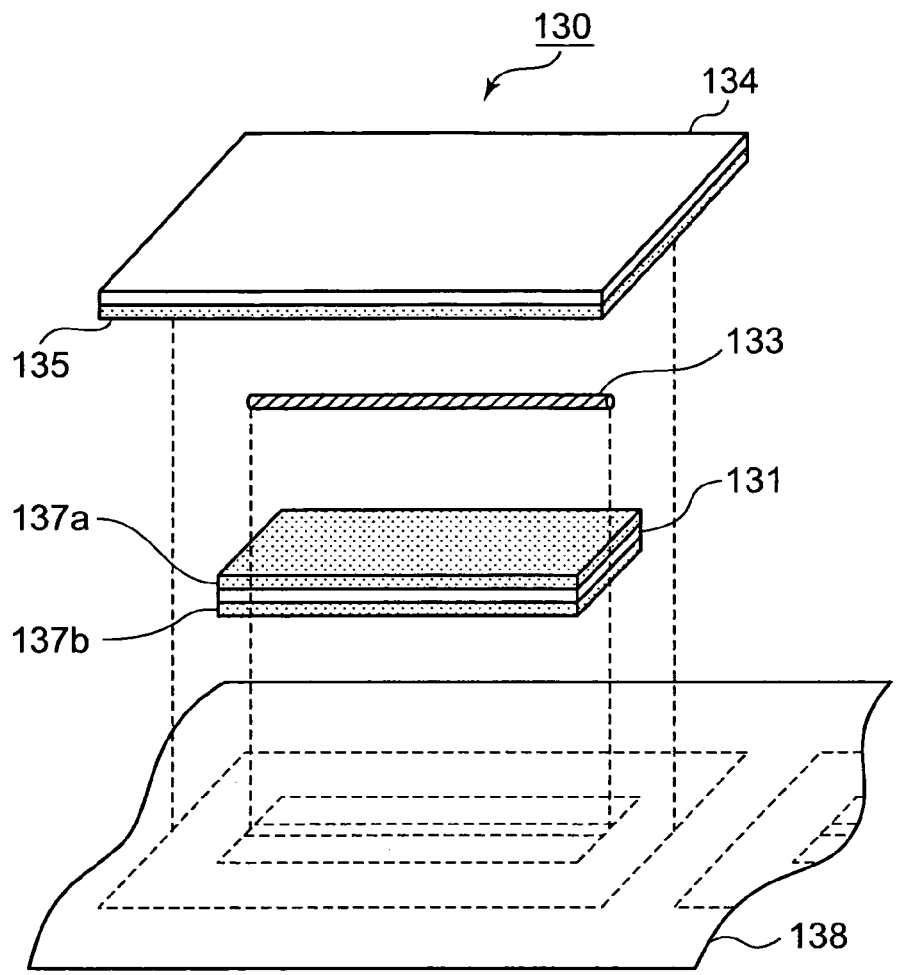
FIG. 10 is an exploded perspective view of a flame-retardant tag in the form of a magnetic tag.
Figure 11:
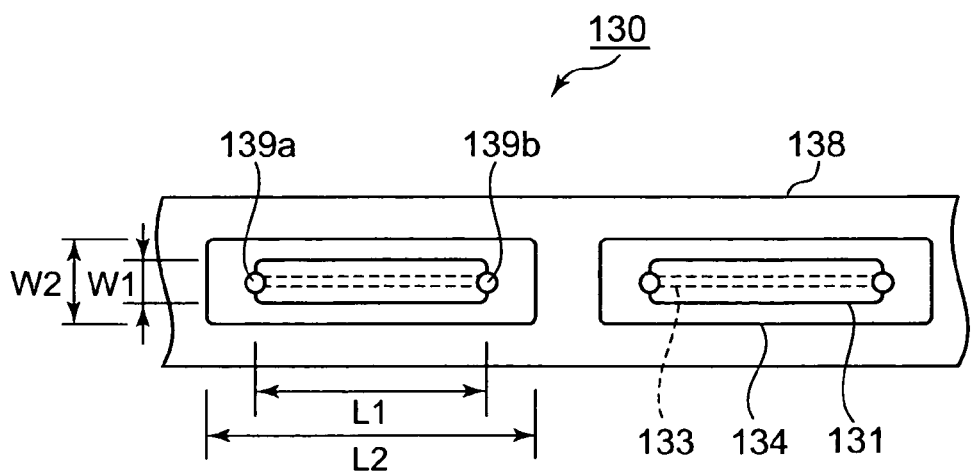
FIG. 11 is a plan view of a magnetic tag in the form of a label.

FIG. 7 is a plan view of a flame-retardant tag of the present invention, in the form of a noncontact IC tag, and FIG. 8 is a sectional view of the flame-retardant tag shown in FIG. 7. FIG. 9 is an exploded perspective view of a flame-retardant tag, in the form of a resonance tag, of the present invention. FIG. 10 is an exploded perspective view of a flame-retardant tag, in the form of a magnetic tag, of the present invention, and FIG. 11 is a plan view of a magnetic tag in the form of a label.

As shown in FIG. 7, a flame-retardant tag 110, in the form of a noncontact IC tag, of the present invention comprises a base film 111, an antenna coil (antenna pattern) 112 formed on the base film 111, and an IC chip 113 connected to both ends 112a, 112b of the antenna coil 112. The antenna coil is not limited to the magnetic induction coil as shown in FIG. 7, and it may also be a dipole antenna, a patch antenna, or the like. The IC chip 113 is conventional one having a noncontact communication facility, a memory, and controllers for them.

The sectional view of the flame-retardant tag 110 is shown in FIG. 8. A surface-protective sheet (surface-protective member) 114 is laminated, with an adhesive layer 115, to the top surface of the base film 111 bearing the antenna coil 112 (such a film is usually referred to as an "inlet base film"). This surface-protective sheet 114 is for preventing the antenna coil 112 and the IC chip 113 from being damaged and also for making it possible to print some images, characters, etc. on the tag surface.

In FIG. 8, the adhesive layer 115 and the base film 111 are depicted with a space between them. Actually, however, the adhesive layer 115 and the base film 111 or antenna coil 112 are in close contact with each other.

The surface of the base film 111 that will be faced to an adherend is provided with a pressure-sensitive adhesive layer 117. The pressure-sensitive adhesive layer 117 is formed beforehand on release paper 118 having a surface coated with a release agent, and this release paper 118 is laminated to the base film 111 of the IC tag with the pressure-sensitive adhesive layer 117 facing to the base film 111.

Such a laminate in the form of a label is also referred to as an IC tag label. Since the release paper 118 is removed from the pressure-sensitive adhesive layer when the IC tag is attached to an object, it does not affect the flammability of the tag attached to the object. The release paper itself is therefore not included in the constituent layers of the IC tag of the invention. The same applies to a resonance tag and a magnetic tag that will be described later.

The noncontact IC tag 110 may be not only in the form of a label but also in the form of a card which a indication sheet, substitutive of the surface-protective member 114, is originally laminated to the base film 111. Since a noncontact IC tag in the form of a card is not attached to any object, it has no pressure-sensitive adhesive layer 117. Such a tag is also referred to as a laminated card. Flame-retardant tags of the present invention can be used as both labels and laminated cards.

In the present invention, a flame-retardant material containing a halogen-free flame retardant is used for at least one of the constituent layers of the noncontact IC tag 110, that is, either the base film 111 or the surface-protective sheet 114. Using a flame-retardant material for one constituent layer, it is possible to enhance the nonflammability of the tag as a whole. Of course, flame-retardant materials may be used for the two constituent layers of the noncontact IC tag 110.

FIG. 9 is an exploded perspective view of a flame-retardant tag in the form of a resonance tag.

Although there are various types of resonance tags, a resonance tag 120 usually has a base film 121 serving as a dielectric and is obtained by laminating metal foil, such as aluminum foil, to both surfaces of the base film 121 and photo-etching the metal foil to give a resonance circuit. As shown in FIG. 9, the resonance circuit is as follows: the metal foil 122 laminated to one surface of the base film 121 is a circuit in a helical pattern, composed of a coil 122a, a condenser electrode area 122b at one end of the coil 122a, and a circuit terminal area 122c at the other end of the coil 122a; and the metal foil 123 laminated to the other surface of the base film 121 has a condenser electrode area 123a and a circuit terminal area 123b.

In order to complete the resonance circuit, the circuit terminal area 122c of the helical circuit formed in the metal foil 122 on one surface of the base film 121 is connected to the circuit terminal area 123b of the metal foil 123 on the other surface of the base film 121. To connect the two circuit terminal areas, there is adopted, for example, pressure welding which the two metal-foil-made terminal areas are welded with pressure so that they are brought into contact to form a short circuit. By forming a short circuit in this manner, a resonance circuit having three elements, a resistance R, an inductance L, and a capacitance C, is formed and consequently has a resonance frequency.

A helical pattern may be formed not only in the metal foil 122 but also in the metal foil 123 on the other surface of the base film 121. In this case, two helical patterns are firstly formed on one base film side by side, and this base film is then folded in two so that each fold has one helical pattern. The resonance circuit may be in some other forms.

The helical coil 122a on the front side and the condenser electrode area 123a on the backside are usually covered, for protection, by surface-protective sheets (surface-protective member) 124a, 124b having adhesive layers 125, 126, respectively. Release paper with a pressure-sensitive adhesive layer may further be laminated to the back surface of the surface-protective sheet 124b.

A resonance tag has no information memory but resonates at a certain frequency of electrical radiation. Therefore, if it has been attached to an article, the tag can be detected when the article passes through a gate that emits electrical radiation with the resonance frequency. Resonance tags have therefore been used for burglar protection and so forth.

In the flame-retardant tag 120 of the invention, a flame-retardant material containing a halogen-free flame retardant is used for at least one of the constituent layers of the resonance tag, that is, either the base film 121 or the surface-protective -sheet 124a, 124b. Of course, flame-retardant materials may be used for the two constituent layers of the resonance tag.

A magnetic tag contains a magnet-sensitive wire, and a magnetic system detects a change in magnetic field caused by the magnetic-sensitive wire and sends out a warning. Such a magnetic system makes use of the Barukhausen effect: abrupt flux reversal occurs in the magnetic wire in response to a change in external magnetic field, so that a sharp, great voltage pulse appears in a detector coil. Owing to this effect, the magnetic system sends out a warning when an article to which a label having a magnetic wire has been attached passes through a detection area. Magnetic tags are thus useful for burglar protection.

Such a tag containing a magnet-sensitive wire is in the following form: a rigid, thin metal wire, sandwiched between labels serving as supports, is further supported by release paper.

FIG. 10 is an exploded perspective view of a magnetic tag. As shown in this figure, a magnet-sensitive-wire-containing tag 130, a flame-retardant tag, has a magnet-sensitive wire 133, a linear wire. Both surfaces of a base film 131 are coated with pressure-sensitive adhesives 137a, 137b, and the magnet-sensitive wire 133 is fixed in the pressure-sensitive adhesive 137a. The magnetic wire 133 is further supported by a pressure-sensitive adhesive layer 135 with which a surface-protective sheet (surface-protective member) 134 is covered. The surface of the pressure-sensitive adhesive 137b is protected by release paper 138.

FIG. 11 is a plan view of a magnetic tag in the form of a label. The magnet-sensitive wire 133 is sandwiched between the pressure-sensitive adhesive layer 137a on the base film 131 with a width of W1 (a length of L1) and the pressure-sensitive adhesive layer 135 on the surface-protective sheet 134 whose width W2 (length L2) is greater than the width W1. The pressure-sensitive adhesive layer 137b on the back surface of the base film 131 is protected by release paper (paper or film) 138.

Such a magnetic tag is obtained in the following manner: while continuously feeding a magnet-sensitive wire 133, and a base film 131 whose both surfaces are coated with a pressure-sensitive adhesive, one pressure-sensitive adhesive layer being covered with release paper 138, stamping is conducted so that each section of the stamped wire has a predetermined length; a surface-protective sheet 134 with a pressure-sensitive adhesive layer 135 is fed and is laminated to the base film 131 surface bearing the magnet-sensitive wire 133; and the laminate is stamped again into individual tags. In order not to harm the operator's fingers with the sharp, hard tips of the magnetic-sensitive wire, the step of making small holes 139a, 139b is effected simultaneously with the stamping for the second time.

Such a magnetic tag and a method for producing it are also described in Japanese Laid-Open Patent Publication No. 245559/2002.

In the flame-retardant tag 130 of the present invention, a flame-retardant material containing a halogen-free flame retardant is used for at least one of the constituent layers of the flame-retardant tag 130, that is, either the base film 131 or the surface-protective sheet 134. Flame-retardant materials may, of course, be used for the two constituent layers of the flame-retardant tag 130.

The above-description of the flame-retardant tag of the invention is focused on its form. Materials for the flame-retardant tag will now be described below.

The halogen-free flame retardant for use in the flame-retardant tag specifically includes phosphorus compounds and inorganic materials. Examples of phosphorus-containing compounds useful herein include phosphoric ester compounds and polyphosphate compounds. Examples of inorganic materials useful herein include such elements as antimony, aluminum, magnesium, zinc, and tin, which give flame-retardant compounds such as antimony trioxide, aluminum hydroxide, magnesium hydroxide, zinc borate, and tin oxide hydrate.

Conventionally, halogen-containing flame retardants such as chlorine-containing compounds, bromine-containing compounds, and halogen-containing phosphoric esters have been widely used. However, these flame retardants are disadvantageous in that they generate chlorine gas, hydrogen chloride gas, hydrogen bromide gas, dioxin, etc. when waste tags containing them are thermally disposed. In the present invention, no halogen-containing flame retardant is incorporated in at least one of the constituent layers of the flame-retardant tag. More preferably, no or substantially no halogen-containing flame retardant is incorporated in any of the constituent layers of the flame-retardant tag, so that the tag never emits any noxious gas.

The halogen-free flame retardant may be copolymerized or mixed with a plastic material. Phosphorus- or halogen compound-containing flame retardants are copolymerized with linear polyesters composed of acidic components, mainly aromatic dicarboxylic acids, and glycol components to give polyesters. Of these, polyethylene terephthalate containing phosphorus-containing flame retardants are favorably used for the flame-retardant tag of the present invention. Preferred phosphorus compounds include phosphorus compounds having two ester-forming functional groups, such as specific phosphates, phosphinates, and phosphine oxide. The amount of the flame-retardant element to be incorporated is preferably 0.5 to 5.0% by weight of the total weight of the plastic materials.

The phosphoric ester flame retardant may be of a type that is blended with a resin by kneading. The amount of the flame retardant of this type to be incorporated is from 1 to 10% by weight of the resin. When this amount is less than 1% by weight of the resin, the mixture is insufficient in nonflammability, while when this amount is more than 10% by weight of the resin, the mixture shows properties that are poor as a plastic material. Commercially available phosphoric ester flame retardants useful herein include "PX200" manufactured by Daihachi Chemistry Co., Ltd., Japan, and "Adecastab" manufactured by ADEKA CORPORATION, Japan.

Paper for the base film is obtained by impregnating a cellulose paper base with a flame retardant. Since such conventional flame-retardant paper is often poor in surface characteristics, it is preferable to use the following paper: flame-retardant paper obtained by applying coating liquids containing pigments, binders, etc. to conventional flame-retardant paper; paper bases that have been made flame retardant as a whole by forming coating layers composed of inorganic compounds, binders, etc. on base paper containing a large amount of inorganic compound powders; and paper bases that have been made flame retardant as a whole by forming the above coating layers on the above base paper after impregnating the base paper with flame retardants.

Another useful flame-retardant paper is one proposed in Japanese Laid-Open Patent Publication No. 287892/1994, which can be obtained by applying a coating liquid containing, as main ingredients, a pigment and a fireproofing agent, to one surface or both surfaces of base paper.

For paper, aluminum hydroxide is favorably used as the fireproofing agent (inorganic pigment). This is because since aluminum hydroxide gives water when burns, it is good in self-extinguishing properties. Besides aluminum hydroxide, such an inorganic powder as clay, talc, kaolin, calcium carbonate, or titanium dioxide may be used. In the case where aluminum hydroxide is used as the fireproofing agent, it is used in such an amount that paper contains approximately 10 to 30% by weight of the agent.

One of, or two or more of aqueous solutions of guanidine sulfamate, other methylol compounds, guanidine phosphate, ammonium sulfamate, ammonium phosphate, and the like may be used as flame retardants.

In the coating liquid, a water-soluble polymer such as starch, PVA, CMC, or casein, a rubber latex such as SBR, NBR, or MBR latex, an acryl emulsion, a vinyl acetate emulsion, or an acryl-vinyl acetate copolymer emulsion may be incorporated as a binder to increase the adhesion strength of the inorganic powder. Flame-retardant paper can be obtained by applying the coating liquid to one surface or both surfaces of base paper by a two-roll side press, a gate roll side press, a blade metering side press, other on-machine coater, an air knife coater, a blade coater, or the like.

Examples of commercially available non-combustible paper useful herein include "OK Cosmo" manufactured by Oji Tokushushi Co., Ltd., Japan, and "Cellaform" manufactured by LINTEC Corporation, Japan. Commercially available flame-retardant paper useful herein includes "Boenshi" manufactured by LINTEC Corporation, Japan. Glass fiber paper is also commercially available and is useful in the invention. It is preferable to use paper highly rated as non-combustible, flame-retardant, or flameproof paper.

For the flame-retardant tag of the present invention, a plastic film or sheet of flame-retardant grade may be used together with one constituent layer made from a flame-retardant material containing a halogen-free flame retardant. This is because combination use of such a plastic film or sheet and the flame-retardant constituent layer can make, as a whole, the nonflammability of the tag higher than that of a tag using no such a flame-retardant plastic film or sheet. Of course, it is most preferable to use flame-retardant materials containing halogen-free flame retardants for every constituent layer of the tag. However, this may boost production cost or narrow the range of material choice. To avoid these problems, a halogen-containing plastic material of flame-retardant grade or the above-described flame-retardant paper base may be co-used. Plastic materials of flame-retardant grade include polyethylene tetrafluoride and ABS resins.

Although polyethylene tetrafluoride (usually referred to as "Teflon" (trademark)) is highly nonflammable, it burns when its temperature is raised high, and generates a noxious gas. For this reason, it is preferable to co-use a fluorine- or chlorine-free plastic film or sheet.

Flame retardants are contained in some ABS resins of flame-retardant grade. ABS resins containing bromine flame retardants are excellent in nonflammability. For example, the nonflammability of ABS resin "AN-450", etc. available from US Rubber Corporation is rated "V-0" according to the criteria specified in the EL standard. The nonflammability of ABS resins containing halogen-free flame retardants is rated "V-2" according to the criteria specified in the EL standard, and such resins include "AN-435" available from US Rubber Corporation.

Flame-retardant sheets "PSZ950", "PSZ951", etc. manufactured by Shin-Etsu Polymer Co., Ltd., Japan are made from polymer alloys of polycarbonate (PC) resins and ABS resins. Although the PC resins contain antimony, these sheets contain no halogens and thus are of halogen-free, flame-retardant grade. The nonflammability of these sheets is higher than that of olefinic materials.

"Dianium MS9002" (trademark) manufactured by Mitsubishi Plastics, Inc., Japan is a halogen-free polyphenylene ether (PPE) sheet whose nonflammability is rated "94V-0" according to the criteria specified in the UL standard for flammability of plastic materials. "Lumirror ZV10" manufactured by Toray Industries, Inc., Japan is a halogen-free, flame-retardant polyester film whose nonflammability is rated "94V-0". "Dialamy" (trademark) manufactured by Mitsubishi Plastics, Inc., Japan is a flame-retardant polyester film whose nonflammability is rated "VTM-0" according to the criteria specified in the UL standard, although it contains a chlorine flame retardant.

UL (Underwriters Laboratories Inc.) is a nonprofit organization approved by the state government of Delaware, U.S.A., and its principle is "testing for public safety". UL has developed UL safety standards and testing methods, covering new electric products, parts, and materials. UL94 (revised in 1994) is a standard for the flammability of plastic materials.

The testing method specified in UL94 is as follows: after putting, for 10 seconds, 5 specimens for one sample in the flame of a burner burning under prescribed conditions, the specimens are removed from the flame, and the time for which each specimen continue burning is measured. The criteria specified in the order of nonflammability are "94V-0" (most non-flammable), "94V-1", and "94V-2".

(1) Base Film

A variety of plastic films can be used for the base film. One of the following films, or a composite film of two or more of the following films, may be used as the base film, after making it flame-retardant in the above-described manner: films of polyethylene terephthalate (PET), PET-G (terephthalic acid-cyclohexane dimethanol-ethylene glycol copolymers), polycarbonate, polyamide, polyimide, cellulose diacetate, cellulose triacetate, polystyrenes, ABS, polyacrylic esters, polypropylene, polyethylene, polyurethane, and so forth.

(2) Surfacing Material

A variety of plastic films and paper bases can be used for the surfacing material. Examples of plastic films useful herein include the above-described plastic films of flame-retardant grade. Examples of paper bases include such paper as wood-free paper, coated paper, craft paper, glassine paper, synthetic paper, and latex- or melamine-impregnated paper, flame-retardant paper obtained by fireproofing the above paper, and glass fiber paper.

(3) Adhesive, Pressure-Sensitive Adhesive

The word "adhesive" used herein encompasses adhesives of various types, such as solvent type adhesives, polymerization type adhesives, ultraviolet-curing adhesives, emulsion adhesives, and hot-melt adhesives, and so-called pressure-sensitive adhesives are also included in this word. This is because adhesives of any type can meet the purpose of laminating two members. It is however preferable to use flame-retardant adhesives or pressure-sensitive adhesives.

The word "pressure-sensitive adhesive" as used herein means an adhesive whose viscosity does not significantly increase with time and whose mild tackiness remains almost permanently.

Examples of resin materials herein useful for the adhesive or pressure-sensitive adhesive include natural rubber, nitrile rubber, epoxy resins, vinyl acetate emulsions, acrylic resins, acrylic ester copolymers, polyvinyl alcohols, and phenolic resins.

EXAMPLES

The second embodiment of the present invention will now be described more specifically by way of Examples.

Example 1

A laminate of a halogen-free, flame-retardant ABS resin (an alloy of ABS and PC (polycarbonate)) sheet with a thickness of 50 μm ("PSZ950" manufactured by Shin-Etsu Polymer Co., Ltd., Japan) and aluminum foil with a thickness of 25 μm, obtained by dry lamination, was used as the base film 111 of a noncontact IC tag label. A photosensitive resist was applied to this base film. The resist surface was covered with a photomask having antenna coil patterns and was then exposed to light. After conducting exposure development, the resist layer was photo-etched, whereby an inlet base film having antenna coils 112 as shown in FIG. 7 was obtained. The external size of each antenna coil 112 was made about 45 mm×76 mm.

To both ends 112a, 112b of each antenna coil 112 on the above-described inlet base film 111, an IC chip 113 with a plane size of 1.0 millimeter square and a thickness of 150 μm was connected by hot pressing with the IC chip 3 facing down. A 50-μm thick surface-protective sheet 114 made of the same material as that of the base film 111 ("PSZ950" manufactured by Shin-Etsu Polymer Co., Ltd., Japan) was then laminated, with an epoxy adhesive, to the base film 111 bearing the IC chips 113. Finally, release paper 118 was laminated to the back surface of the base film 111 with a 32-μm thick pressure-sensitive adhesive layer 117, and this laminate was cut into individual flame-retardant tags 110 with release paper, the size of each tag containing one IC chip 113 being 54 mm×86 mm.

Example 2

A laminate of a halogen-free, flame-retardant polyester film with a thickness of 40 μm ("Lumirror ZV10" manufactured by Toray Industries, Inc., Japan) and aluminum foil with a thickness of 25 μm, obtained by dry lamination, was used as the base film 111 of a noncontact IC tag label. A photosensitive resist was applied to this base film. The resist surface was covered with a photomask having antenna coil patterns and was then exposed to light.

After conducting exposure development, the resist layer was photo-etched, whereby an inlet base film having antenna coils 112 as shown in FIG. 7 was obtained. The external size of each antenna coil 112 was made about 45 mm×76 mm.

To both ends 112a, 112b of each antenna coil 112 on the above-described inlet base film 111, an IC chip 113 with a plane size of 1.0 millimeter square and a thickness of 150 μm was connected by hot pressing with the IC chip 3 facing down. A surface-protective sheet 114 made of 40-μm thick flame-retardant paper ("Boenshi" manufactured by LINTEC Corporation, Japan) was then laminated, with an epoxy adhesive, to the base film 111 bearing the IC chips 113. Finally, release paper 118 was laminated to the back surface of the base film 111 with a 32-μm thick pressure-sensitive adhesive layer 117, and this laminate was cut into individual flame-retardant tags 110 with release paper, the size of each tag containing one IC chip 113 being 54 mm×86 mm.

Example 3

A laminate of a 100-μm thick flameproofed film of modified polyphenylene ether ("Dianium MS9002" manufactured by Mitsubishi Plastics, Inc., Japan) and aluminum foil with a thickness of 25 μm, obtained by dry lamination, was used as the base film 111 of an IC tag label. A photosensitive resist was applied to this base film. The resist surface was covered with a photomask having antenna coil patterns and was then exposed to light.

After conducting exposure development, the resist layer was photo-etched, whereby an inlet base film having antenna coils 112 as shown in FIG. 7 was obtained. The external size of each antenna coil 112 was made about 45 mm×76 mm.

To both ends 112a, 112b of each antenna coil 112 on the above-described inlet base film 111, an IC chip 113 with a plane size of 1.0 millimeter square and a thickness of 150 μm was connected by hot pressing with the IC chip 3 facing down. A surface-protective sheet 114 made of a 40-μm thick, halogen-free, flame-retardant polyester film ("Lumirror ZV10" manufactured by Toray Industries, Inc., Japan) was then laminated, with an epoxy adhesive, to the base film 111 bearing the IC chips 113. Finally, release paper 118 was laminated to the back surface of the base film 111 with a 32-μm thick pressure-sensitive adhesive layer 117, and this laminate was cut into individual flame-retardant tags 110 with release paper, the size of each tag containing one IC chip 113 being 54 mm×86 mm.

Example 4

A laminate of a halogen-free, flame-retardant polyester film with a thickness of 40 μm ("Lumirror ZV10" manufactured by Toray Industries, Inc., Japan) and aluminum foil with a thickness of 25 μm, obtained by dry lamination, was used as the base film 121 of an IC tag label. A photosensitive resist was applied to both surfaces of this base film. The resist surfaces covered with photomasks having coil patterns and condenser patterns were exposed to light.

After conducting exposure development, the resist layers were photo-etched, whereby an inlet base film 121 having coils 122a and condenser patterns 122b, 122c as shown in FIG. 9 was obtained. The center portion of each coil 122a on the front side and each condenser pattern 123a on the backside were then connected (the part 122c and the part 123b in FIG. 9).

To both surfaces of the above inlet base film 121, surface-protective sheets 124a, 124b made of 40-μm thick, non-combustible paper ("Cellaform" manufactured by LINTEC Corporation, Japan) were laminated with an epoxy adhesive. This laminate was cut into individual flame-retardant tags 120, resonance tags, each tag being in a size of approximately 60 mm×60 mm.

Example 5

A halogen-free, flame-retardant ABS resin (an alloy of ABS and PC (polycarbonate)) sheet with a thickness of 50 μm ("PSZ951" manufactured by Sin-Etsu Polymer Co., Ltd., Japan), whose both surfaces had been coated with a highly sticky pressure-sensitive adhesive (one pressure-sensitive adhesive layer being covered with release paper 138), was used as the base film 131 of a magnetic tag 130. The same flame-retardant sheet with a thickness of 50 μm ("PSZ951" manufactured by Sin-Etsu Polymer Co., Ltd., Japan), whose one surface had been coated with a pressure-sensitive adhesive, was used as the surface-protective sheet 134. A 50-μm thick film coated with PET/silicon was used as the release paper 138. A Co—Fe—V alloy wire with a diameter of 250 μm and a length of 50 mm was used as the magnet-sensitive wire 133.

These materials were processed by the use of the prescribed processing machine, thereby obtaining a flame-retardant tag 130, a magnetic tag, having the structure as shown in FIG. 10 or 11.

The flame-retardant tags 110 (noncontact IC tags) of Examples 1, 2, and 3 were attached to objects, and readout tests were conducted by using an IC tag reader/writer ("RCT-200-01" manufactured by Well Cat Co., Ltd., Japan) operating at 13.56 MHz. These tags functioned normally in non-contact communication. The flame-retardant tag 120 of Example 4 and the flame-retardant tag 130 of Example 5 were tested in the electric article surveillance system. They functioned well in this system.

Further, the nonflammability of the flame-retardant tags of Examples 1 to 5 was tested by the method specified in the UL standard No. 94. As a result, the tags were rated "94V-2".

Third Embodiment

A third embodiment of the present invention will be described hereinafter.

An IC tag of the third embodiment is characterized in that a silver-zeolite antibacterial/mildewproofing agent is incorporated in adhesive layers 5, 6 and in an acrylic or rubber pressure-sensitive adhesive layer 7. The lamination of the tag of this embodiment is almost the same as that of the tag of the first embodiment shown in FIGS. 1 to 5.

A silver-zeolite antibacterial/mildewproofing agent is incorporated in the adhesive layers 5, 6 and the pressure-sensitive adhesive layer 7 shown in FIGS. 1 to 5.

In this embodiment, the silver-zeolite antibacterial/mildewproofing agent is "Zeomic XAW 10D" available from Sinanen Zeomic Co., Ltd., Japan. One part by weight of Zeomic XAW 10D and 100 parts by weight of a pressure-sensitive adhesive are mixed so that the former is substantially uniformly distributed in the latter.

"Zeomic XAW 10D" (hereinafter simply referred to as "Zeomic") is added to coated paper 4 constituting a surface sheet as well.

The characteristics of Zeomic will be described below.

Zeomic is a silver-ion-containing inorganic antibacterial/mildew-proofing agent, and it is in the form of a powder or slurry. This powder or slurry can be incorporated in a fiber, a resin, or the like.

The word "antibacterial" herein means suppression of proliferation of bacteria, and "mildewproofing", suppression of proliferation of mildews.

Silver ion has both antibacterial and mildewproofing actions. Zeomic can suppress proliferation of such bacteria as colon bacilli, enterohemorrhagic *Escherichia coli* (O-157), *Staphylococcus aureus,* and *Pseudomonas aeruginosa,* such yeast as *Candida,* and such molds as black *Aspergillus* and *Penicillium notatum.*

The MIC (Minimum Inhibitory Concentration) of Zeomic is approximately 250 ppm for a test strain of *Staphylococcus aureus,* from about 250 to 500 ppm for a test strain of methicillin resistant *Staphylococcus aureus* (MRSA), and from about 100 to 200 ppm for a test strain of *Pseudomonas aeruginosa.*

Antibacterial action tests were made on polyethylene (PE) films in which Zeomic had been incorporated. The test results are shown in Table 1. For the tests was used the method specified in JIS Z2801 ("Bacteria Resistant Articles—Method for Testing Antibacterial Action; Antibacterial Effect", the 2000 version). Specimen 1 is a PE film containing no Zeomic, and Specimen 2, a PE film containing 0.5% by weight of Zeomic.

TABLE 1

| | Staphylococcus aureus | | colon bacilli | |
|---|---|---|---|---|
| Specimen | number of bacteria | bacteria resistance value | number of bacteria | bacteria resistance value |
| 1 | $4.7 \times 10^4$ | — | $9.3 \times 10^6$ | — |
| 2 | <10 | 3.7 or more | <10 | 6.0 or more |

In the above table, the "bacteria resistance value" is the logarithm of the value obtained by dividing the number of bacteria on the non-bacteria resistant article (Specimen 1) after 24-hour cultivation by the number of bacteria on the bacteria resistant article (Specimen 2) after 24-hour cultivation. According to JIS Z2801 mentioned above, a specimen with a bacteria resistance value of 2.0 or more is regarded as bacteria resistant. In Table 1, "<10" means that no bacteria are detected.

As can be seen from Table 1, the bacteria resistance value of Specimen 2 for *Staphylococcus aureus* is 3.7 or more, and that of Specimen 2 for colon bacilli is 6.0 or more. These data demonstrate that Specimen 2 is bacteria resistant and that Zeomic has antibacterial action.

After removing the release paper 8, the noncontact IC tag 1 shown in FIG. 2 is attached to the bottom of tableware such as a dish, cup, or bowl, with the pressure-sensitive adhesive layer 7 of the base film 11.

The dish or the like is herein one made from a resin material such as PE. A silver-zeolite antibacterial/mildewproofing agent is incorporated also in the resin material for the dish or the like.

Such tableware is used in the system in which such information as the price of food placed on a dish or the like is recorded in the IC chip 3 of the noncontact IC tag 1 attached to the dish, and the total price of food on two or more dishes is calculated instantaneously by letting the tags 1 attached to the dishes to communicate simultaneously with a reader.

As described above, the noncontact IC tag 1 of this embodiment can bring about the following effects.

(1) Since Zeomic, a silver-zeolite antibacterial/mildewproofing agent having both antibacterial action and mildewproofing action, is incorporated in the pressure-sensitive adhesive layer 7 with which the IC tag 1 is attached to tableware, it is possible to prevent proliferation of bacteria and mildews at the interface between the IC tag 1 and the tableware.

(2) Since Zeomic is incorporated also in the adhesive layers 5 and 6, it is possible to prevent proliferation of bacteria and mildews on the IC tag 1 itself.

(3) Since the IC tag 1 is flexible, it can be bent along a curved adherend surface, such as a curved bottom surface of tableware, and can thus be attached to the adherend with good adhesion.

(4) Since the antenna pattern 2 and the IC chip 3 that constitute the communication circuit of the IC tag 1 are airtightly enclosed by the surface-protective member 4 and the base film 11, even when tableware to which the IC tag 1 has been attached is washed with water, washing water never comes into the communication circuit of the IC tag 1.

(Modifications)

The invention may be embodied in other specific forms without departing from the spirit or essential characteristics thereof. The above embodiment is therefore to be considered in all respects as illustrative and not restrictive, and all changes which come within the meaning and range of equivalency of the appended claims are intended to be embraced in the present invention.

(1) In the above embodiment, the material having antibacterial action and mildewproofing action (antibacterial/mildewproofing agent) to be incorporated in the pressure-sensitive agent is a silver-containing antibacterial/mildewproofing agent. The antibacterial/mildewproofing agent useful in the present invention is not limited to silver-containing one, and any other antibacterial/mildewproofing agent may be added to the pressure-sensitive adhesive instead of the silver-containing one. In this case, the antibacterial/mildewproofing agent may be of organic, natural, or inorganic, and may be selected with consideration for the use of an adherend to which the IC tag will be attached. For example, if the adherend to which the IC tag will be attached is not a food-relating object such as tableware, a zinc- or copper-containing antibacterial/mildew-proofing agent may also be used.

(2) In the above embodiment, the IC tag is in the form of a label provided with a pressure-sensitive adhesive layer. The present invention is not limited to this. For example, an IC tag having no pressure-sensitive adhesive layer may be attached to an adherend with an adhesive in the form of gel, containing an antibacterial/mildewproofing agent, or with a double-coated tape having pressure-sensitive adhesive layers containing antibacterial/mildewproofing agents.

(3) In the above embodiment, the object to which the IC tag is attached is tableware. However, the object to which the IC tag is attached is not limited to tableware, and the IC tag may also be attached to a container for carrying food, for example. In this case, an antibacterial/mildewproofing agent may be incorporated also in the material for the container.

The invention claimed is:

1. A noncontact tag comprising:
a base film,
a noncontact circuit formed on the base film,
a surface-protective member covering the noncontact circuit, and
two strip members placed between the base film and the surface-protective member, on both sides of the noncontact circuit,
a belt-shaped space being made between the two strip members so that the noncontact circuit is positioned in the space.

2. The noncontact tag according to claim 1, wherein the strip members are made of paper or a plastic film with a uniform thickness of 50 to 250 μm.

3. The noncontact tag according to claim 1, wherein the strip members are made of a magnetic sheet with a uniform thickness of 50 to 250 μm.

4. The noncontact tag according to claim 1, wherein the noncontact circuit is an IC circuit composed of an antenna pattern and an IC chip connected to the antenna pattern,
the IC chip being positioned in the belt-shaped space between the two strip members.

5. The noncontact tag according to claim 1, wherein the noncontact circuit is a resonance circuit composed of a helical pattern and a condenser pattern,
the resonance circuit being positioned in the belt-shaped space between the two strip members.

6. The noncontact tag according to claim 1, wherein the noncontact circuit is a magnetic circuit having a magnet-sensitive wire,
the magnetic circuit being positioned in the belt-shaped space between the two strip members.

7. The noncontact tag according to claim 1, wherein the base film or the surface-protective member is made from a flame-retardant material containing a halogen-free flame retardant.

8. The noncontact tag according to claim 1, wherein an adhesive layer is formed on the back surface of the base film, a material having at least one of antibacterial action and mildewproofing action being used to form the adhesive layer.

9. The noncontact tag according to claim 1, wherein the strip members are laminated to the base film with an adhesive layer, and the surface-protective member is laminated to the strip members with an adhesive layer, materials having at least one of antibacterial action and mildewproofing action being used to form the two adhesive layers.

10. A method for producing a noncontact tag, comprising the steps of:
(1) forming a plurality of noncontact circuits on a continuous base film, (2) placing in parallel a large number of strip members on the base film so that one noncontact circuit is positioned in a belt-shaped space between each two neighboring strip members,
(3) laminating a continuous surface-protective member to the noncontact circuits and the strip members, and
(4) cutting the laminate of the continuous base film and the continuous surface-protective member into sections so that each section contains one noncontact circuit, or perforating this laminate so that the laminate can be cut along the perforations into sections, each section containing one noncontact circuit.

11. The method for producing a noncontact tag according to claim 10, wherein the strip members are made of paper or a plastic film with a uniform thickness of 50 to 250 μm.

12. The method for producing a noncontact tag according to claim 10, wherein the strip members are made of a magnetic sheet with a uniform thickness of 50 to 250 μm.

\* \* \* \* \*